United States Patent [19]

Jung

[11] Patent Number: 5,502,492
[45] Date of Patent: Mar. 26, 1996

[54] MOTION VECTOR DETECTION APPARATUS

[75] Inventor: Hae-Mook Jung, Seoul, Rep. of Korea

[73] Assignee: Daewoo Electronics Co., Ltd., Seoul, Rep. of Korea

[21] Appl. No.: 225,223

[22] Filed: Apr. 8, 1994

[30] Foreign Application Priority Data

Apr. 9, 1993 [KR] Rep. of Korea .................. 93-5969

[51] Int. Cl.$^6$ .................................................. H04N 7/36
[52] U.S. Cl. .................................. 348/413; 348/416
[58] Field of Search .......................... 348/699, 416, 348/402, 411, 412, 413, 420; H04N 7/36

[56] References Cited

U.S. PATENT DOCUMENTS 5,200,820  4/1993  Gharavi ............................ 348/699
5,235,419  10/1993  Krause ............................. 348/416
5,351,095  9/1994  Kerdranvat ....................... 348/699

Primary Examiner—Tommy P. Chin
Assistant Examiner—A. Au
Attorney, Agent, or Firm—Anderson Kill Olick & Oshinsky

[57] ABSTRACT

An apparatus for determining motion vectors between a current frame and a previous frame of digital video signals apparatus comprises a subblock motion vector detector for detecting a subblock motion vector for each of the subblocks included in a panning block within the current frame; a panning vector detector for detecting a panning vector for the panning block; a motion vector determination circuit for determining whether the previous frame is motion compensated by the panning vector to produce a control signal; and in response to the control signal, selecting the subblock motion vector from the subblock motion vector detector or the panning vector from the panning vector detector as an output of the motion vector detecting apparatus.

3 Claims, 4 Drawing Sheets

MOTION VECTOR DETECTION APPARATUS

FIELD OF THE INVENTION

The present invention relates to a motion vector detection apparatus for use in a digital image compressing system; and, more particularly, to a motion vector detection apparatus adapted to detect a panning vector for a generally large panning area in a sequence of moving pictures to reduce the amount of data to be compressed for transmission.

DESCRIPTION OF THE PRIOR ART

In digital processing systems such as video-telephone, teleconference and high definition television systems, a large amount of digital data is required to define each frame of video signals since each line of an image frame comprises a sequence of digital data referred to as pixels. However, the available frequency bandwidth of a conventional transmission channel to transmit the data is limited. Therefore, it has become necessary to reduce the substantial amount of data by way of employing various data compression techniques.

Interframe coding technique is one of the effective coding methods to compress data in video sequences. Motion-compensated coding, especially, can further enhance the efficiency of image coding for the transmission of compressed data. This technique is built on the idea of predicting a current frame data from a previous frame data based on an estimation of the motion between the current and the previous frames. Such estimated motion may be described in terms of two dimensional motion vectors representing the displacement of pixels between the previous and the current frames.

Several methods for estimating the displacement of an object in a video sequence have been proposed. Generally, they can be classified into two types: pixel recursive algorithm; and block matching algorithm (see, e.g., J. R. Jain et al, "Displacement Measurement and Its Application in Interframe Image Coding", *IEEE Transactions on Communications*, COM-29, No. 12(December 1981)). The present invention is primarily concerned with the block matching algorithm.

In accordance with the block matching algorithm, a current frame is divided into a plurality of search blocks. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out a similarity measurement between the search block of the current frame and one of the candidate blocks in the search region. And a motion vector, by definition, represents the displacement between the search block and a candidate block which yields a minimum "error" or difference. Each of the motion vectors is coded and then transmitted by a transmitter incorporating the motion-compensated coding scheme through the transmission channel to a receiver which reconstructs the current frame through the use of the transmitted motion vectors.

In the motion-compensated coding technique, it may happen that a motion in the video sequence is localized or localized upon an object with most of its surroundings or background stationary, or that the motion is simply translational, e.g., as in case of a camera panning. In such event, there may be little difference between the actual and the predicted values of the video sequence. Consequently, there may exist a number of motion vectors with an identical displacement. In the motion-compensated coding scheme, however, all of the motion vectors are coded before being transmitted, including the motion vectors with an identical displacement, which tends to lower the efficiency of the data compression system.

SUMMARY OF THE INVENTION

It is, therefore, a primary object of the present invention to provide an improved motion vector detecting apparatus for use in a digital image compression system.

It is another object of the present invention to provide a motion vector detecting apparatus for determining a panning vector with respect to a panning area in a sequence of moving pictures, to thereby enhance the data compression efficiency of the digital image compression system.

In accordance with one aspect of the invention, there is provided an improved apparatus for determining motion vectors between a current frame and a previous frame of digital video signals. The motion vector detecting apparatus comprises a subblock motion vector detector for detecting a subblock motion vector for each of the subblocks included in a panning block within the current frame; a panning vector detector for detecting a panning vector for the panning block; a motion vector determination circuit for determining whether the previous frame is motion compensated by the panning vector to produce a control signal; and means, in response to the control signal, for selecting the subblock motion vector from the subblock motion vector detector or the panning vector from the panning vector detector as an output of the motion vector detecting apparatus.

BRIEF DESCRIPTION OF THE DRAWINGS

The foregoing and other objects, features and advantages of the present invention will become apparent from the following detailed description of preferred embodiments of the invention with reference to the accompanying drawings, in which.

DETAILED DESCRIPTION OF THE PREFERRED EMBODIMENTS

In a digital image compression system employing a motion-compensated coding, a digitized input video signal consisting of one frame is fed to a motion vector detecting apparatus. Essentially at the same time, a previous frame of digitized video signal, preceding the current frame by a one-frame period, is provided to the motion vector detecting apparatus. The motion vector detecting apparatus defines motion vectors based on a comparison between the current frame of the input video signal and the previous frame of the previous video signal. A motion vector, which is represented as an output signal from the motion vector detecting apparatus, is used to generate a motion-compensated video signal block by a motion compensator(not shown).

Figure 1:
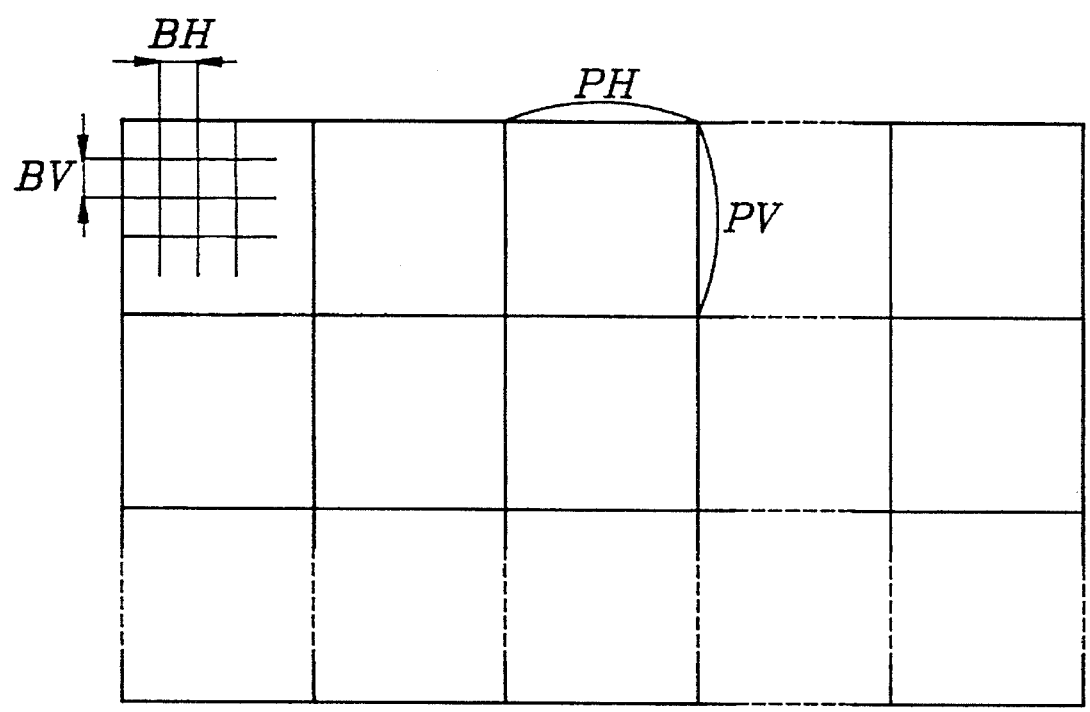
FIG. 1 shows an exemplary current frame within the context of the present invention.

For the purpose of illustrating the present invention, the current frame is exemplarily shown in FIG. 1. As shown, the current frame is divided into a first multiple number of generally large panning blocks of a first identical size, i.e., PH×PV, each panning block having a second plural number of subblocks or search blocks of a second identical size, i.e., BH×BV.

As used in the present invention, a subblock motion vector is referred to as a motion vector for each of the subblocks included in a panning block within the current frame; and a panning vector shall be referred to as a motion vector for the panning block. The present invention is premised upon the idea that motion vectors with an identical displacement can be detected in a translational or a stationary area within a video sequence.

The description of the inventive motion vector detection apparatus will now be made with reference to FIG. 2, wherein there is shown a block diagram of a motion vector detection apparatus in accordance with a preferred embodiment of the present invention. The current frame is inputted through line L2 to a subblock motion vector detector 20 to which the previous frame has also been inputted through line L4. Actually, the input digital video signal is read out, on a block-by-block basis, from an input memory (not shown), wherein each frame of video signals is stored as successive subblocks of pixel data for processing. The subblock motion vector detector 20 is designed to detect subblock motion vectors for each of the subblocks from the current frame. Each of the subblock motion vectors is supplied to one input of a multiplexer 28 via a delay circuit 26 and to a panning vector detector 30 through line L6. The detailed operation of the subblock motion vector detector 20 will be further described with reference to FIG. 3.

The panning vector detector 30 detects a panning vector for a panning block. The panning vector detected by the panning vector detector 30 is provided to another input of the multiplexer 28 and a motion vector determination unit 40 through line L8. The detailed operation of the panning vector detector 30 will be further described with reference to FIG. 4.

The motion vector determination unit 40 determines whether the previous frame is motion compensated by the panning vector and provides to the multiplexer 28 a control signal for allowing the multiplexer 28 to select each of the subblock motion vectors or the panning vector with respect to the panning block.

Figure 2:
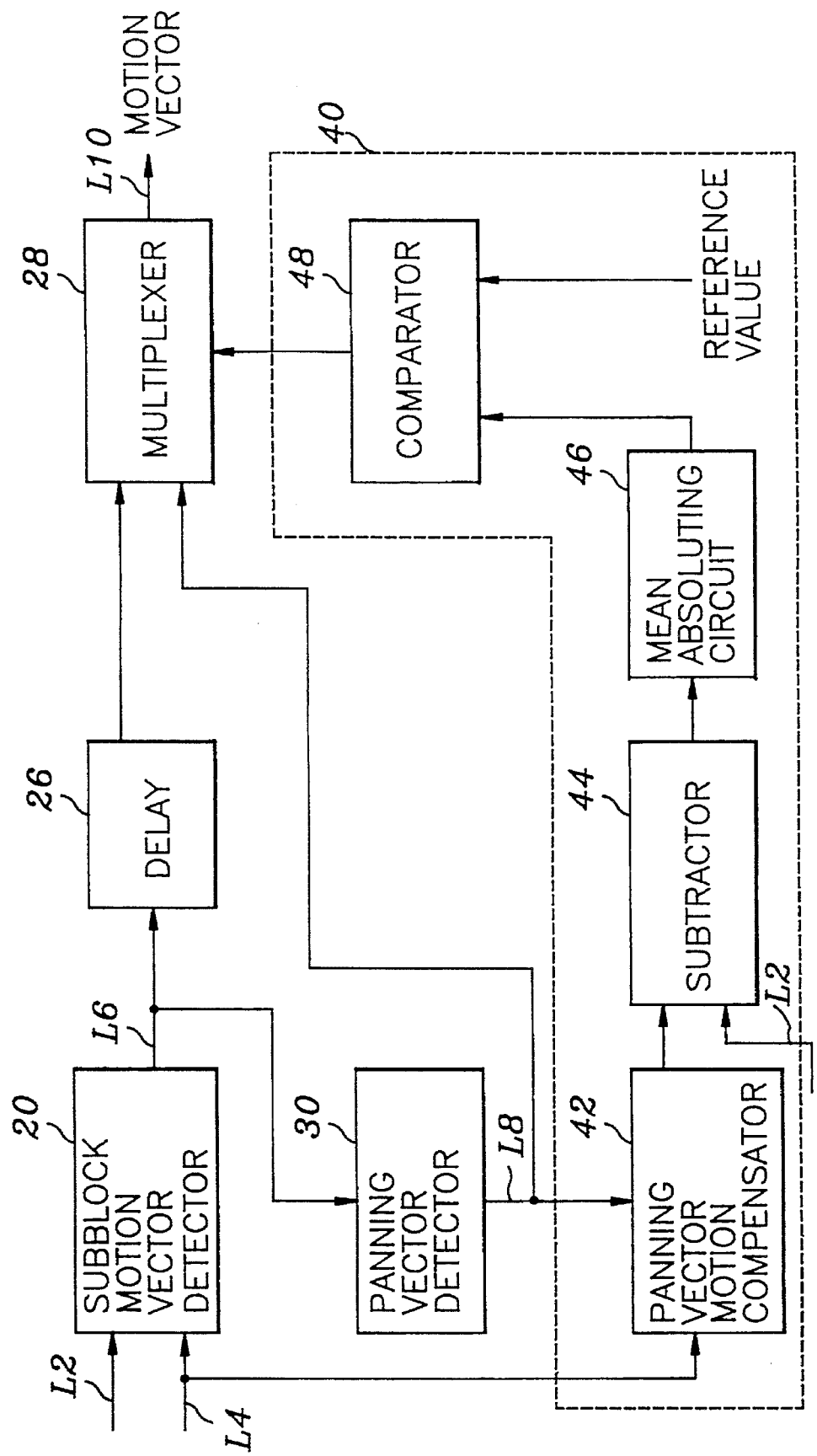
FIG. 2 illustrates a block diagram of a motion vector detection apparatus in accordance with the present invention.
Figure 3:
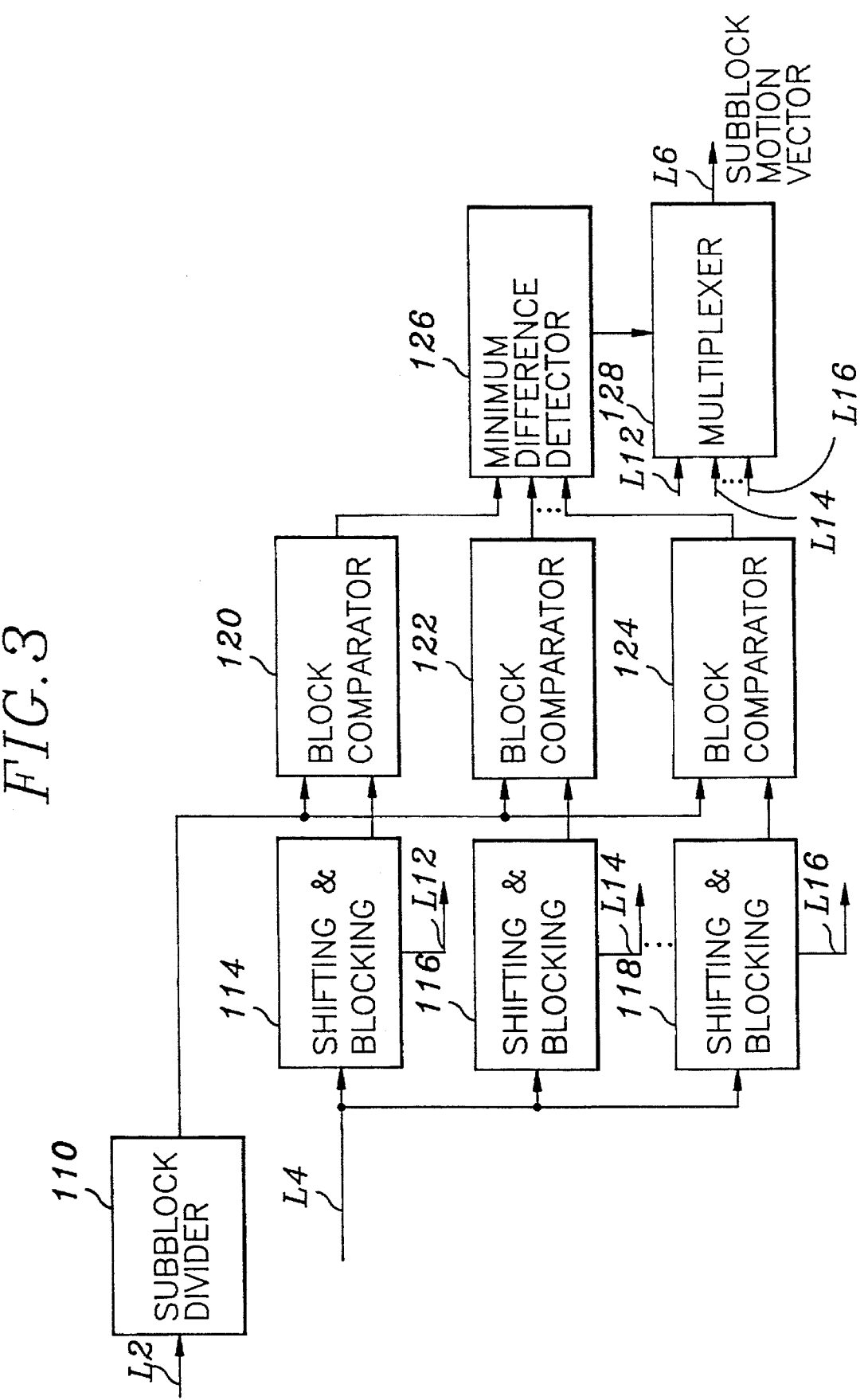
FIG. 3 provides a detailed block diagram of the subblock motion vector detector shown in FIG. 1.

Referring now to FIG. 3, there is shown a detailed block diagram of the subblock motion vector detector 20 shown in FIG. 2, which utilizes a conventional block matching algorithm. The set of subblocks of a second identical size, i.e., BH×BV (e.g., 16 pixels×16 pixels), is sequentially applied to a subblock divider 110. Each of the subblocks in the subblock divider 110 is simultaneously distributed to a set of block comparators 120 to 124. Meanwhile, a search region within the previous frame on line L4 is simultaneously distributed to a set of shifting and blocking circuits 114 to 118. Each of the shifting and blocking circuits 114 to 118 defines its corresponding candidate block of the second identical size within the search region, respectively. Each of the candidate blocks in each of the shifting and blocking circuits 114 to 118 is supplied in parallel to the set of block comparators 120 to 124. Also, each of the shifting and blocking circuits 114 to 118 produces a subblock motion vector representing the displacement between the subblock and each of the candidate blocks; and each of the subblock motion vectors from the shifting and blocking circuits 114 to 118 is supplied through lines L12 to L16 to a multiplexer 128, respectively.

On the other hand, the set of block comparators, 120 to 128, compares the subblock and the candidate block supplied thereto in order to calculate an "error" or difference between the subblock and the candidate block, respectively. The comparison by the block comparators may be achieved by employing any of the algorithms well known in the art, e.g., NCCF (normalized cross-correlation function), NMSE (normalized mean square error) or MNAW (mean number of bits necessary to binary code the absolute error).

Each of the calculated differences from the block comparators 120 to 128 is supplied to a minimum difference detector 126 which determines the smallest difference among the calculated differences and provides to the multiplexer 128 a detection signal for allowing the multiplexer 128 to select the subblock motion vector corresponding to the subblock entailing the smallest difference. The multiplexer 128, in response to the detection signal, selectively provides the selected subblock motion vector to the panning vector detector 30 through line L6.

Figure 4:
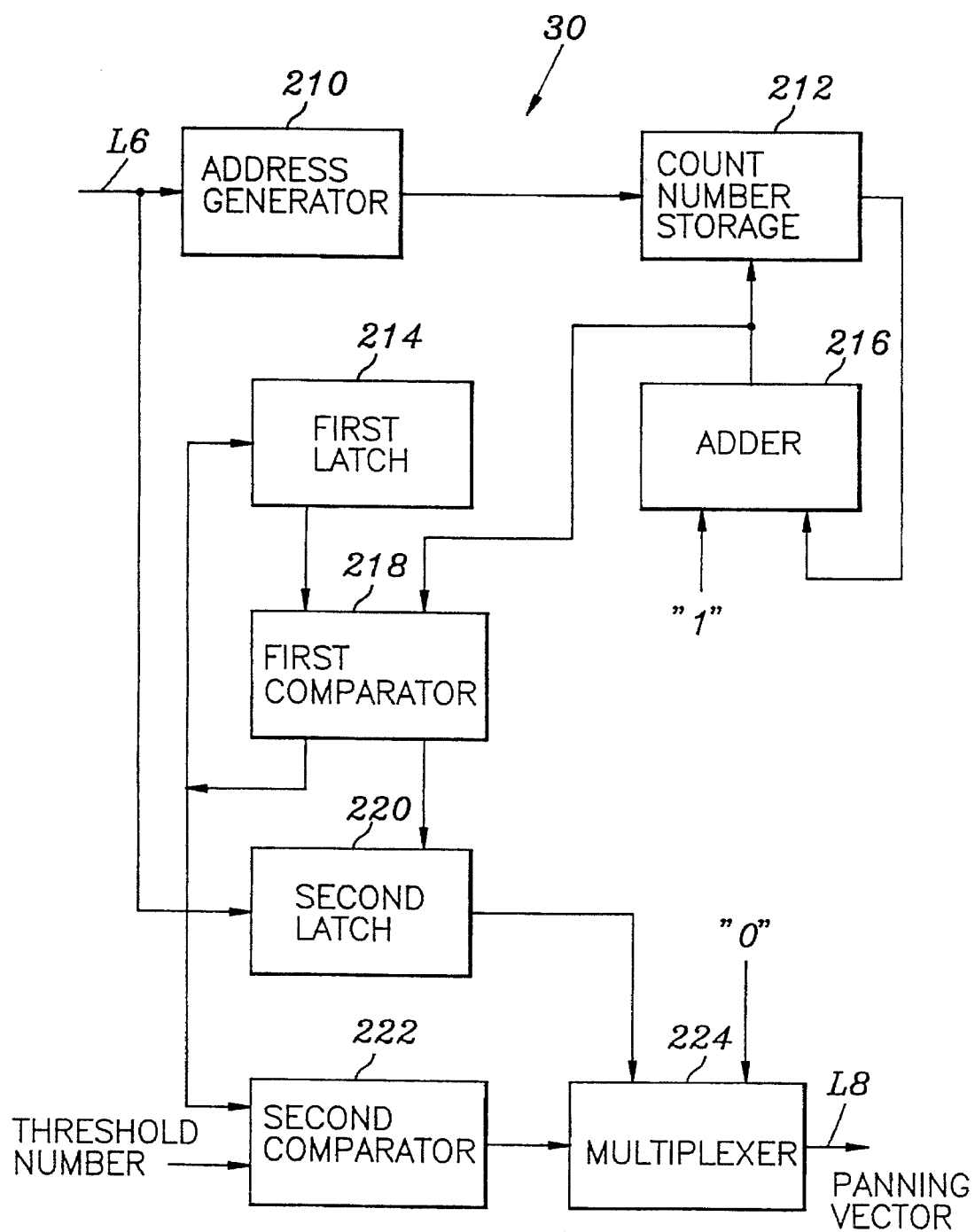
FIG. 4 offers a detailed block diagram of the panning vector detector shown in FIG. 1.

FIG. 4 shows a detailed block diagram of the panning vector detector 30 shown in FIG. 1. Each of the subblock motion vectors derived from the subblock motion vector detector 20 shown in FIG. 3 is sequentially applied to an address generator 210 including an address look-up table and applied to a latch circuit 220.

The subblock motion vectors can be used to indicate the location in the address generator 210. That is, each of the subblock motion vectors can be used as the information to access the corresponding location in the address look-up table of the address generator 210. In response to the subblock motion vector, the address generator 210 generates an address signal stored in the accessed location of the address look up table 210. The address signal generated from the address generator 210 is provided to a count number storage 212 for storing a counted number for the subblock motion vectors with an identical displacement and is used to address a corresponding storage location of the count number storage 212. When the address signal is applied to the count number storage 212, a counted number is read out from the storage location of the count number storage 212 corresponding to the address signal and then is increased by a count "1" through the use of an adder 216. The increased number is restored into the storage location of the count number storage 212 to update the counted number. Accordingly, the subblock motion vectors with an identical displacement can be successively counted in a same storage location. The increased number is also provided to a first comparator 218. The first comparator 218 compares the increased number with the counted number of the subblock motion vectors previously latched in a first latch 214. In comparison, if the increased number is greater than the previously latched counted number, the increased number is stored into the first latch 214. Consequently, the previously latched counted number is updated with the increased number from the adder 216. If not, however, the previously latched counted number remains in the first latch 214 as it is. As a result, the first latch 214 will always have the maximum counted number of the subblock motion vectors with the identical displacement at present.

The first comparator 218 also provides the maximum counted number to a second comparator 222 and provides a control signal to a second latch 220 whenever it is determined that the increased counted number is greater than the previously latched counted number. In response to the control signal, the second latch 220 receives a subblock motion vector being supplied through line L6 at present. Consequently, the second latch 220 has the subblock motion vector corresponding to the maximum counted number of the subblock motion vectors with an identical displacement at present.

On the other hand, the maximum counted number determined by the first comparator 218 is compared with a predetermined threshold number at the second comparator 222. In case where the maximum counted number is greater than the predetermined threshold number, the second comparator 222 provides to a second multiplexer 224 a selection signal for allowing the second multiplexer 224 to select the subblock motion vector latched in the second latch 220 as an output of the panning vector detector 30. The selected subblock motion vector at the second multiplexer 224 is assigned as the panning vector for the panning block and supplied to the multiplexer 28 through line L8 and the motion vector determination section 40 as shown in FIG. 2.

In accordance with the preferred embodiment of the present invention, the predetermined threshold number is set to have the number corresponding to at least 30% of the total number of the subblocks included within a given panning block. Accordingly, in case where the maximum counted number from the first comparator 218 is smaller than the predetermined threshold number, the second multiplexer 224 selects a value "0" indicating that there is no panning vector with respect to the given panning block. The above mentioned process will be repeated until the subblock motion vector detection is done with respect to all of the subblocks included within the panning block; and the counted number in the count number storage 212 and the first latch 214 will be cleared per each panning block.

Referring back to FIG. 1, a panning vector motion compensator 42, in response to the panning vector from the panning vector detector 30 through line L4, compensates the previous frame block. The motion-compensated previous frame block by the panning vector motion compensator 42 is applied to a subtractor 44. The subtractor 44 subtracts the current frame block from line L2 from the motion-compensated previous frame block to produce a difference signal between the current frame block and the motion-compensated previous frame block. The difference signal from the subtractor 44 is applied to a mean absoluting circuit 46 where the mean absolute value thereof is calculated. A comparator 48 compares the mean absolute value from the mean absoluting circuit 46 with a predetermined reference value and provides a control signal to the multiplexer 28. In case where the mean absolute value is greater than the predetermined reference value, the comparator 48 allows the multiplexer 28 to select the subblock motion vector as an output of the motion vector detecting apparatus. However, in case where the mean absolute value is smaller than the reference value, the comparator 48 allows the multiplexer 28 to select the panning vector as the output of the motion vector detecting apparatus. The motion vector from the multiplexer 28 will be provided to the motion compensator (not shown) in the image compression system and coded before being transmitted to the receiver. In coding the motion vector, an index bit having one bit per subblock may be assigned to identify whether the coded motion vector is a subblock motion vector or a panning vector in the receiver.

While the present invention has been described with respect to the particular embodiments, it will be apparent to those skilled in the art that various changes and modifications may be made without departing from the spirit and scope of the invention as defined in the following claims.

What is claimed is:

1. An apparatus for detecting a motion vector between a current frame and a previous frame of digital video signals, wherein the current frame is divided into a multiplicity of generally large panning blocks, each of the panning blocks having a plurality of subblocks, which comprises:

a subblock motion vector detector for detecting a subblock motion vector for each of the subblocks included in a panning block within the current frame;

a panning vector detector for detecting a panning vector for the panning block, wherein said panning vector detector includes:

means, in response to each of the subblock motion vectors applied thereto from the subblock motion vector detector, for counting the number of the subblock motion vectors with an identical displacement with respect to the panning block so as to determine a maximum counted number of the subblock motion vectors with the identical displacement;

means for storing the subblock motion vector at the time of the determined maximum counted number;

means for comparing the maximum counted number of the subblock motion vectors with a predetermined threshold number; and means for assigning as the panning vector the subblock motion vector in said storing means when it is determined that the maximum counted number is greater than the predetermined threshold number;

a motion vector determination circuit for determining whether the mean absolute value of the difference signals obtained by subtracting the panning block from a motion-compensated previous frame block generated from the previous frame by using the panning vector is greater or smaller than a predetermined reference value to produce a control signal; and means, in response to the control signal, for selecting the subblock motion vector from the subblock motion vector detector or the panning vector from the panning vector detector as an output of the apparatus for determining motion vectors.

2. The apparatus of claim 1, wherein said predetermined threshold number has a number corresponding to at least 30% of the total number of the subblocks included in the panning block.

3. The apparatus of claim 1, wherein the motion vector determining circuit includes:

a panning vector motion compensator for motion compensating the previous frame by the panning vector to produce the motion-compensated previous block;

a subtractor for subtracting the panning block within the current frame from the motion-compensated previous block to produce the difference signals between the panning block within the current frame and the motion-compensated previous block;

a mean absoluting circuit for calculating the mean absolute value of the difference signals; and a comparator for comparing the mean absolute value with the predetermined reference value to provide the control signal to the selecting means so as to allow the selecting means to select the subblock motion vector when the mean absolute value is greater than the predetermined reference value and to allow the selecting means to select the panning vector when the mean absolute value is smaller than the predetermined reference value.

* * * * *